(12) United States Patent
Reiter

(10) Patent No.: US 7,914,845 B2
(45) Date of Patent: Mar. 29, 2011

(54) DATA ZONE LUBE REMOVAL

(75) Inventor: Jeffrey Shane Reiter, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 140 days.

(21) Appl. No.: 12/179,825

(22) Filed: Jul. 25, 2008

(65) Prior Publication Data

US 2010/0021773 A1 Jan. 28, 2010

(51) Int. Cl.
*G11B 5/71* (2006.01)
(52) U.S. Cl. ............... 427/128; 428/825.1; 428/835.6
(58) Field of Classification Search ............ 428/825.1, 428/873.1, 843.3, 835.6, 835.7, 835.8, 833.3; 427/127; 360/131, 133, 135
See application file for complete search history.

(56) References Cited

U.S. PATENT DOCUMENTS

| | | | |
|---|---|---|---|
| 5,232,570 A | 8/1993 | Haines et al. | |
| 5,559,650 A | 9/1996 | Repphun et al. | |
| 5,674,582 A | 10/1997 | Eltoukhy et al. | |
| 5,822,163 A * | 10/1998 | Lee et al. | 360/135 |
| 6,031,615 A | 2/2000 | Meeks et al. | |
| 6,096,385 A * | 8/2000 | Yong et al. | 427/510 |
| 6,130,749 A | 10/2000 | Meeks et al. | |
| 6,168,831 B1 * | 1/2001 | Khan et al. | 427/240 |
| 6,198,533 B1 | 3/2001 | Meeks et al. | |
| 6,229,610 B1 | 5/2001 | Meeks et al. | |
| 6,268,919 B1 | 7/2001 | Meeks et al. | |
| 6,392,749 B1 | 5/2002 | Meeks et al. | |
| 6,497,925 B1 | 12/2002 | Chen et al. | |
| 6,503,405 B1 | 1/2003 | Chen | |
| 6,524,730 B1 | 2/2003 | Chen | |
| 6,589,641 B1 | 7/2003 | Stirniman et al. | |
| 6,685,076 B2 | 2/2004 | Couillard | |
| 6,717,671 B1 | 4/2004 | Meeks et al. | |
| 6,821,627 B2 | 11/2004 | Stirniman et al. | |
| 2008/0171234 A1 * | 7/2008 | Imamura | 428/827 |
| 2009/0097165 A1 * | 4/2009 | Osawa et al. | 360/314 |

FOREIGN PATENT DOCUMENTS

WO WO/2006/103828 * 10/2006

* cited by examiner

*Primary Examiner* — Timothy H Meeks
*Assistant Examiner* — Tabassom Tadayyon Eslami
(74) *Attorney, Agent, or Firm* — Arent Fox LLP

(57) ABSTRACT

A method of manufacturing for providing closer head-to-media spacing, and the resulting disk, includes evenly lubricating a magnetic media disk, increasing the viscosity of a selected non-data zone region of the disk, and removing at least a portion of the lower viscosity region of the lubrication layer in a data zone region of the disk, thereby decreasing the thickness of the lubrication layer in the data zone portion of the lower viscosity region, producing a magnetic media disk capable of closer head-to-media spacing in the data zone portion of the lower viscosity region of the lubrication layer than in the non-data zone portion.

16 Claims, 4 Drawing Sheets

Schematic Representation of the Film Structure in Accordance With a Magnetic Recording Medium of the Prior Art.

← Protective overcoat 23

← Magnetic layer 22

← Underlayer 21

← Substrate 20

← Underlayer 21'

← Magnetic layer 22'

← Protective overcoat 23'

Figure 1. Schematic View of a Magnetic Disk Drive (related art).
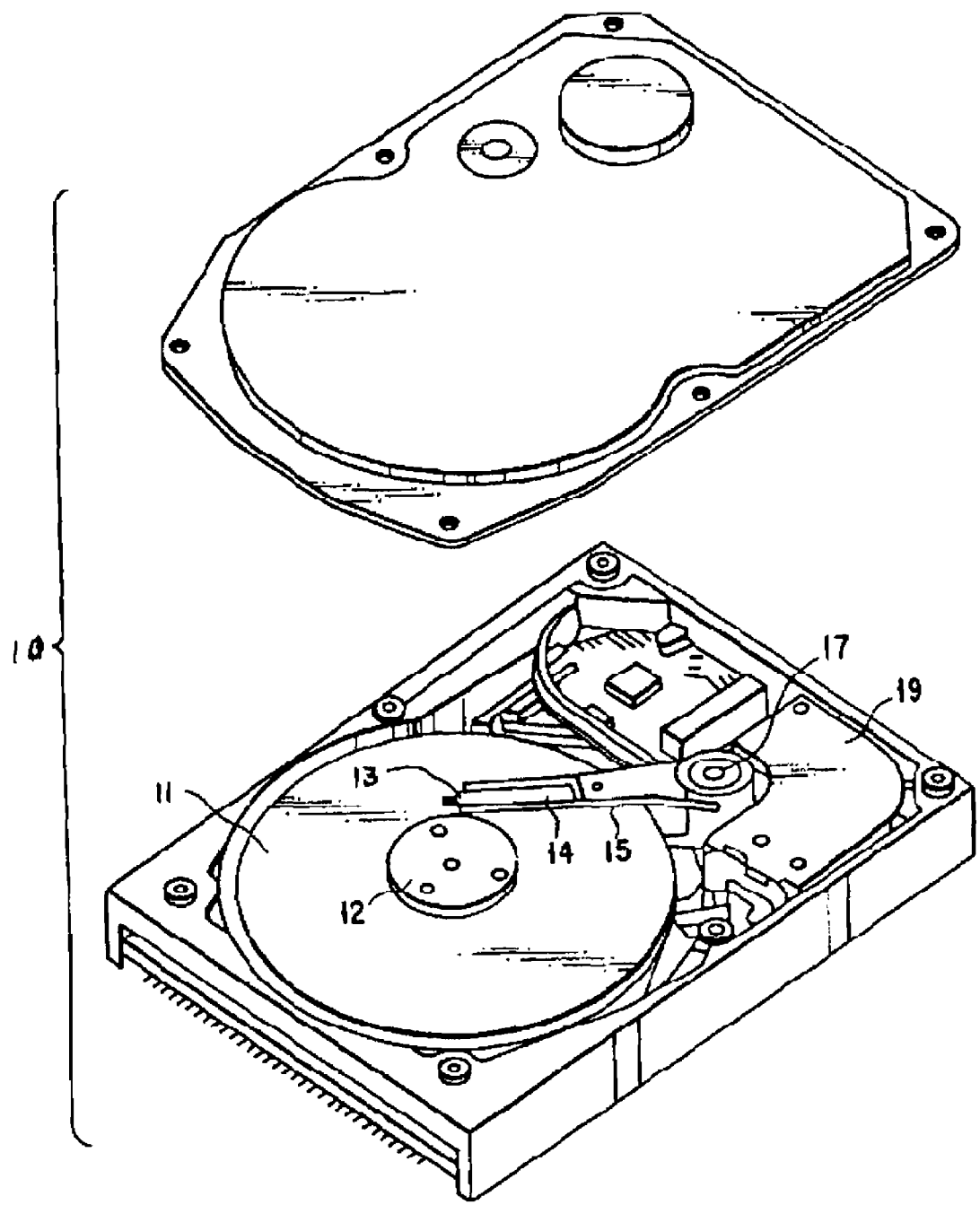

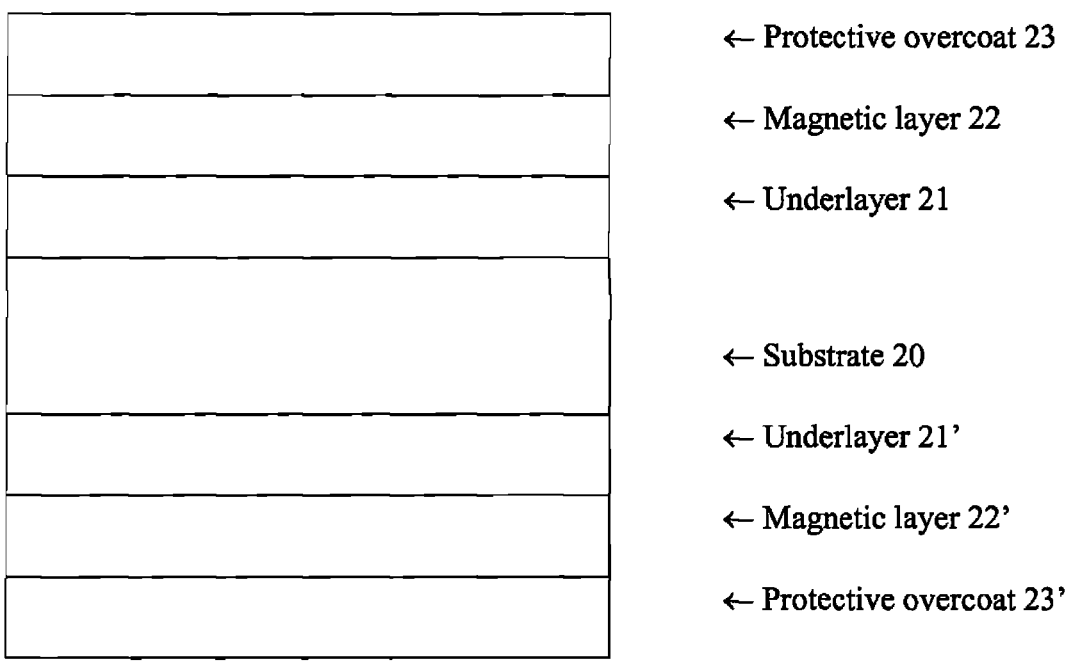
Figure 2. Schematic Representation of the Film Structure in Accordance With a Magnetic Recording Medium of the Prior Art.

Figure 3. Perspective View of a Magnetic Head and a Magnetic Disk (related art).
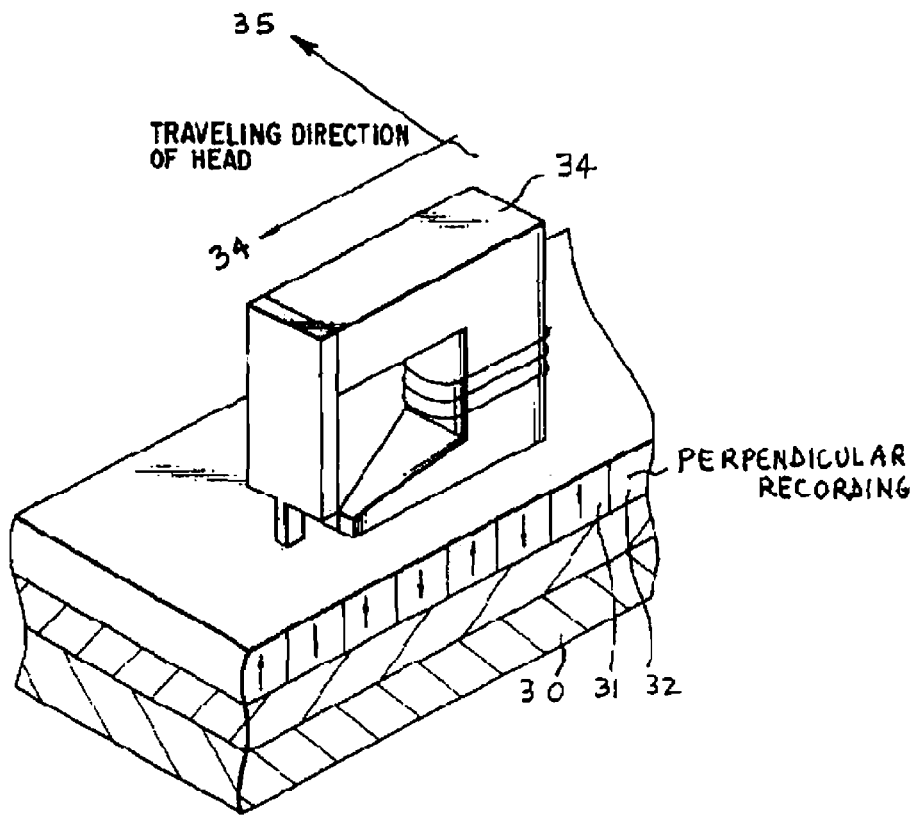

Figure 4. Manufacturing Process

DATA ZONE LUBE REMOVAL

RELATED APPLICATIONS

None.

BACKGROUND

None.

SUMMARY

The present invention relates to a manufacturing method of improving the signal-to-medium noise ratio of a magnetic media disk through closer head-to-media spacing, and the resulting disk, by evenly lubricating a magnetic media disk, increasing the viscosity of a selected region of the disk, and removing at least a portion of the lower viscosity region of the lubrication, thereby decreasing the thickness of the lubrication layer in the portion of the lower viscosity region, producing a magnetic media disk capable of closer head-to-media spacing in the portion of the lower viscosity region of the lubrication layer.

The present invention is a method and apparatus for manufacturing of sputtered magnetic media disks, in which the lubricant layer overlying the data zones is thinner than the lubricant layer overlying at least a portion of the non-data zones of the disk. This permits reduced head-to-media spacing, thereby allowing better recording and read-back performance while mitigating the degradation in durability from an increased probability of head-to-media contact or pickup of lubrication by the head.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention a property of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

FIG. 1 is a view of a magnetic disk drive.

FIG. 2 is a schematic representation of the film structure in accordance with a magnetic recording medium of the prior art.

FIG. 3 is perspective view of a magnetic head and a magnetic disk.

DETAILED DESCRIPTION

Figure 4A:
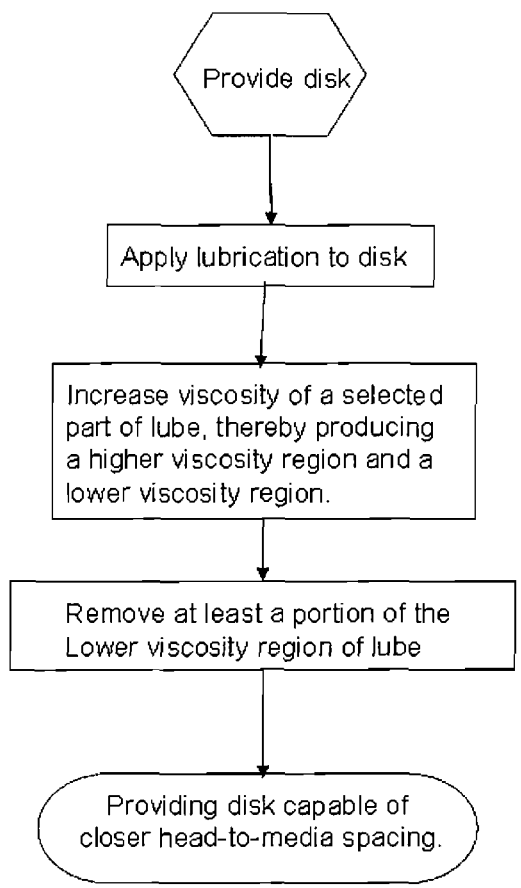
FIGS. 4A-4B are block diagrams of the method used to create a thinner lube layer over the data zone, compared to the lube layer outside the data zone.
Figure 4B:
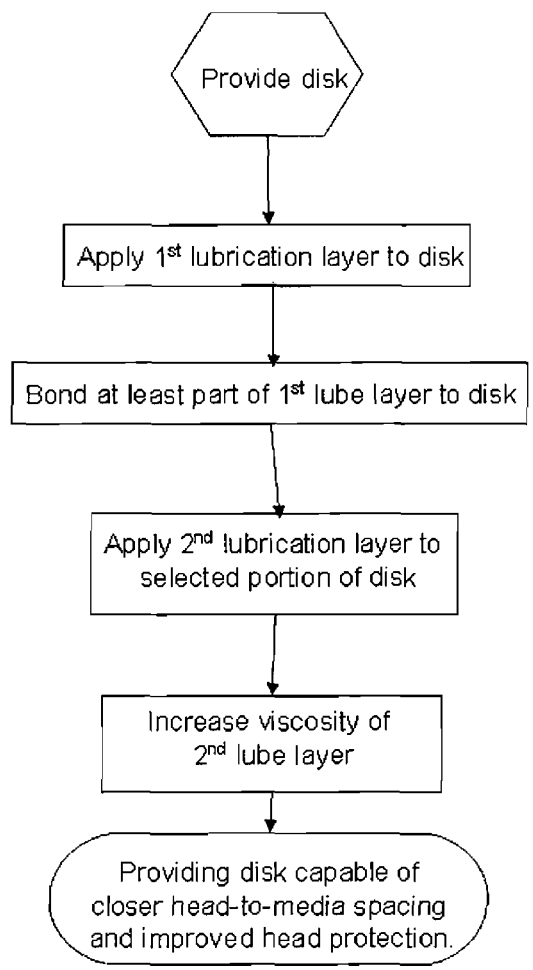

This invention relates to perpendicular recording media, such as thin film magnetic recording disks using perpendicular recording, having improved reading and recording performance. The invention also relates to a method of manufacturing the media. The invention has particular applicability to high areal density magnetic recording media exhibiting low noise.

Magnetic discs with magnetizable media are used for data storage in most all computer systems. FIG. 1 shows a disk recording medium and a cross section of a disc showing the difference between longitudinal and perpendicular recording. Even though FIG. 1 shows one side of the non-magnetic disk, magnetic recording layers are sputter deposited on both sides of the non-magnetic aluminum substrate. Also, even though FIG. 1 shows an aluminum substrate, other embodiments include a substrate made of glass, glass-ceramic, NiP/aluminum, metal alloys, plastic/polymer material, ceramic, glass-polymer, composite materials or other non-magnetic materials.

Current magnetic hard disc drives operate with the read-write heads only a few nanometers above the disc surface and at rather high speeds, typically a few meters per second. Because the read-write heads can contact the disc surface during operation, a layer of lubricant is coated on the disc surface to reduce wear and friction. The lubricant film on hard discs provides protection to the underlying magnetic alloy by preventing wear of the carbon overcoat. In addition, it works in combination with the overcoat to provide protection against corrosion of the underlying magnetic alloy. The reliability of hard disks depends on the durability of the thin film media. As the spacing between head disk is being reduced aggressively to improve area storage density, media are facing many severe technical obstacles, such as weak durability, heavy lubricant pickup by the read-write head, unmanageable stiction/friction, etc. Lubrication plays unquestionably an important role in overcoming these technical difficulties. Previous efforts have attempted selective lube thinning using solvents, but lube migration then becomes more prominent.

The mathematical and physical basis of reading from and writing to perpendicular magnetic recording media is known in the scientific literature, for instance H. J. Richter, The Transition from Longitudinal to Perpendicular Recording, JOURNAL OF PHYSICS D: APPLIED PHYSICS, 19 Apr. 2007 (doi: 10.1088/0022-3727/40/9/R01), the entire contents of which are hereby incorporated by reference. The increasing demands for higher areal recording density impose increasingly greater demands on thin film magnetic recording media in terms of remanent coercivity (Hr), magnetic remanance (Mr), coercivity squareness (S*), medium noise, i.e., signal-to-medium noise ratio (SMNR), and narrow track recording performance. It is extremely difficult to produce a magnetic recording medium satisfying such demanding requirements. One way of improving the SMNR performance is by reducing the head-to-media spacing (HMS). Therefore, there exists a need to reduce the HMS, while mitigating the probability that the head would come in contact with the lubrication, and further while providing greater head protection when HMS need not be reduced.

In operation, a typical contact start/stop (CSS) method involves a floating transducer head gliding at a predetermined distance from the surface of the disk due to dynamic pressure effects caused by air flow generated between the sliding surfaces of the transducer head and the disk. During reading and recording (writing) operations, the transducer head is maintained at a controlled distance from the recording surface, supported on a bearing of air as the disk rotates, such that the transducer head can be freely moved in both the circumferential and radially directions allowing data to be recorded on and retrieved from the surface of the disk at a desired position in a data zone.

To record information on the disc, the transducer creates a highly concentrated magnetic field in close proximity to the magnetic recording medium. During writing, the strength of the concentrated magnetic field directly under the write transducer is greater than the coercivity of the recording medium (known as "saturating" the medium), and grains of the recording medium at that location are magnetized with a direction which matches the direction of the applied magnetic field. The grains of the recording medium retain their magnetization after the saturating magnetic field is removed. As the disc rotates, the direction of the writing magnetic field is alternated based on bits of the information being stored, thereby recording a magnetic pattern on the track directly under the write transducer.

A cross sectional view of a conventional longitudinal recording disk medium is depicted in FIG. 2. A longitudinal recording medium typically comprises a non-magnetic substrate 20 having sequentially deposited on each side thereof an underlayer 21, 21', such as chromium (Cr) or Cr-alloy, a magnetic layer 22, 22', typically comprising a cobalt (Co)-base alloy, and a protective overcoat 23, 23', typically containing carbon. Conventional practices also comprise bonding a lubricant topcoat (not shown) to the protective overcoat. Underlayer 21, 21', magnetic layer 22, 22', and protective overcoat 23, 23', are typically deposited by sputtering techniques. The Co-base alloy magnetic layer deposited by conventional techniques normally comprises polycrystallites epitaxially grown on the polycrystal Cr or Cr-alloy underlayer. Conventional lubricant topcoats are typically about 20 Å thick. Almost all the manufacturing of a disk media takes place in clean rooms where the amount of dust in the atmosphere is kept very low, and is strictly controlled and monitored.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. Furthermore, the continuing requirements for increased recording density and faster data transfer rates necessitates minimizing the spacing between the transducing head and the magnetic media layer, i.e., a reduced head-to-media spacing (HMS). However, if the head surface and the recording surface are too flat, the precision match of these surfaces gives rise to excessive stiction and friction during the start up and stopping phases, thereby causing wear to the head and recording surfaces, eventually leading to what is referred to as a "head crash." As the HMS is reduced, there is a greater probability that the head will make contact with the lubrication. As the HMS in hard disk drives is reduced below 5 nm, there is a need to ensure that the lubricant layer over the data portions of the disk is less than 5 nm in thickness. Lubricant menisci form at the contact points when the head touches the disk. These lubricant menisci can have large capillary forces, resulting in a large friction force when a head contacts a disk. Such contact will result in poor durability due to frequent contact, and from accumulation of lubrication on the head. Thus, there are competing goals of reduced head/disk friction and minimum transducer flying height.

According to conventional practices, a lubricant topcoat is uniformly applied over the protective overcoat layer to prevent wear between the disk and the facing surface of the read/write transducer head during CSS operation. However, an excess amount of lubricant at the head-disk interface causes high stiction between the head and the disk, which stiction, if excessive, prevents starting of disk rotation, hence causing catastrophic failure of the disk drive. Accordingly, the lubricant thickness must be optimized for stiction and friction.

Reducing HMS and minimizing friction/stiction of the head-disk interface have served as an impetus for the development of specialized lubricants for serving as the lubricant topcoat layer overlying the protective overcoat layer. Such lubricants are required to fulfill a variety of functions requiring diverse characteristics and attributes. For example, the lubricant material forming the topcoat layer must be chemically inert, have a low vapor pressure, low surface tension, high thermal stability, mechanical stability under shear stress, and good boundary lubrication properties. In addition to the foregoing, it is critical that the lubricant adhere tightly (as, for example, reflected in the "bonded lube thickness" or "bonded lube ratio") to the underlying surface, i.e., the protective overcoat layer (typically carbon-based), over the lifetime of the disk drive comprising the recording disk and associated flying head data transducer. Free lube is that portion of the lube which is not bonded to the protective overcoat layer of the magnetic disk.

Fluoropolyether (FPE) lubricants are of particular interest in lubricating magnetic recording media. These lubricants are uniquely suited to form lubricant topcoats on magnetic media because of such properties as chemical inertness, low vapor pressure, low surface tension, high thermal stability, stability under high shear stress and good boundary lubrication properties. Among the many lubricants available, liquid perfluoropolyethers (PFPE) are the most typically used in forming topcoat lubricants on magnetic recording media.

Liquid lubrication of the disk surface encounters several problems, however, which limit its effectiveness as used in rotating storage media. For example, it is well known that free lube will migrate and spin off a thin film disk with a carbon overcoat. Typically, PFPE lubricants do not have a retention means so that when the disk rotates, the lubricant tends to spins off the disk. The depletion of the lubricant from the disk surface increases the friction between the disk and the read/write head.

Further, the depletion of the lubricant results in non-uniformity across the surface of the disk resulting in additional operational difficulties. For example, where the thickness is too thin, the head can cause wear on the disk surface and where the lubricant thickness is too great, the head will become stuck in the lubricant (from static friction) and the head or disk could be damaged when the head suddenly becomes unstuck due to the rotating disk.

Head contact with the data portion of the media is to be avoided during normal operation. However, when the disk is not in normal operation, for instance when it is being turned off, the head is designed to move to an area of the disk known as the landing zone. At the landing zone, the media incorporates design features that permit the head to contact the media, and these design features may optionally include usage of a thicker lubrication layer as compared to the data zone.

Reducing the lube layer thickness over the data zone of a magnetic recording disk as compared to the landing zone of the magnetic recording disk, permits a smaller HMS spacing in the data zone. Removing free lube from the data zone while the disk is being manufactured will significantly reduce the probability of lube pickup by the head, and lube puddling in the drive as well as lube ripples during operation.

At least some areas outside the data zone, for instance the landing zone of the magnetic media, will not undergo lube thinning and therefore after processing will have a relatively thicker layer of lube compared the lube layer overlying the data zone. It is not critical to minimize the head-to-media spacing in non-data zone areas to the same extent that it is in the data zone, because the disk does not have the same stringent performance requirements on reading and writing data in the non-data zone areas as compared to the data zone areas. For instance, a greater HMS is allowable in the landing zone or servo track zone (if one is present) at either the inner or outer periphery of the magnetic media disk, thereby permitting a thicker layer of lube compared to the lube thickness in the data zone. The greater HMS and potentially greater lube thickness in non-data areas will allow for decreased risk of damaging contact between the head and the disk in those areas. Contact between the head and the thicker lube layer over the landing zone is permitted when the magnetic disk is not rotating, and when the disk accelerates or decelerates to or from the operational rotation speed.

The present invention is a method for achieving a thinner layer of lube in the data zone of the magnetic disk, as compared to the lube thickness in the non-data portions of the disk, while mitigating the problem of lube migration. One method of decreasing the ability of the lube to migrate is to increase the viscosity of the free lube over non-data portions of the disk. This method does not require texturing of the disk surface or any other structure to assist in retaining lubrication. Once the lube over selected portions of the disk is made more viscous, free lube may be removed from areas of the disk having less viscous lube, thereby resulting in a thinner lube thickness. In a preferred embodiment, the more viscous lube will overlie the non-data portions of the disk, and the less viscous lube will overlie the data portion. The region comprising the data portions of the disk having the less viscous lube may have a coefficient of friction that is approximately less than half of the coefficient of friction of the region comprising the non-data portions of the disk having more viscous lube.

In an embodiment of the method to increase the lubrication viscosity, a PFPE capable of cross-linking is applied to the magnetic recording medium having a distribution of non-data zones therein and polymerized to form a cross-linked PFPE topcoat lubricant. The PFPE may comprise homopolymers, random polymers or block polymers, i.e. the repeating units of the PFPE can be the same or different. In addition, different repeat units may be randomly distributed along the backbone of the polymer or distributed as a block of one type of repeat unit and subsequent blocks of different repeat units along the backbone of the polymer. The lubricants may be completely fluorinated or partially fluorinated and may be linear or branched.

The lubricant topcoat is then made more viscous by crosslinking at least that portion of the lubricant overlying the non-data portions of the disk. Any convenient source of radiation can be used, e.g. a UV laser, to effect polymerization or cross-linking of the applied PFPE on the magnetic disk. The magnetic disk having polymerizable or cross-linkable PFPE thereon may be exposed to UV radiation from a low pressure mercury lamp UV lamp which emits radiation over the range of about 254 nm to about 185 nm. The coated disc may be exposed to UV radiation having an intensity of about several to about 100 or more milliwatts/cm$^2$ for an exposure duration of approximately 10 seconds to about 4 minutes or more to form a cross-linked PFPE lubricant topcoat.

The cross-linked topcoat advantageously forms a relatively immobile coating that serves to prevent migration of any lubrication so cross-linked. Lubrication over at least the data portion of the recording disk may then be thinned without causing migration of the cross-linked lube from the non-data portions of the disk into the data portion of the disk.

Lube thinning over the data zone may be achieved using a pickup head designed for lube pickup, or may be achieved using a tape-based extractor that provides an adjustable amount of pressure, friction, and duration between the disk having the lube to be thinned and the extractor. This may be achieved with or without the use of a solvent to help remove the free lube from the surface of the data portion of the disk. When used, a predetermined amount of solvent is introduced to the data zone area, such that it dissolves a portion of the lube layer overlying the data layer. The solvent is then removed. A similar technique is known in the prior art, for instance as described in U.S. Pat. No. 6,168,831. Optionally, a tape-cleaning device may be used during the cleaning process to remove from the tape any material the tape has removed from the disk.

After lube thinning, the disk may be further processed, for instance by buffing the areas in which lubrication had been removed.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. For example, applying lubrication may be applied to the magnetic media disk, thereby forming a first lubrication layer, where the first lubrication layer being of substantially equal thickness over the entire surface. A portion of the first lubrication layer, such as the region including the non-data zone, may be bonded to the magnetic media disk, making the first lubrication layer more viscous. The bonding method may be, for example, the use of radiation, as described above. A second layer of lubrication may be applied over the non-data zone portion of the disk, i.e., over less than the entire disk. The viscosity of the second lubrication layer over the non-data zone portion of the disk may be increased, thereby producing a higher viscosity region of greater thickness than the region without the second lubrication layer. This results in the magnetic media disk being capable of improved disk-head contact protection in the higher viscosity region of greater thickness. A portion of the first lubrication layer over the data zone portion of the disk may be thinned by removal. Thus, this invention is not intended to be limited to the embodiments shown, but is to be accorded the widest scope consistent with the principles and features disclosed herein.

This application may disclose several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Where the term "plurality" is used, that term shall be construed to include the quantity of one, unless otherwise stated. The entire disclosure of the patents and publications referred in this application are hereby incorporated herein by reference. Finally, the implementations described above and other implementations are within the scope of the following claims.

The invention claimed is:

1. A method of manufacture, comprising:
  applying lubrication to a magnetic media disk, thereby forming a lubrication layer, the lubrication layer being of substantially equal thickness over an entire surface of the magnetic media disk, wherein the surface includes a non-data zone region and a data zone region;
  increasing the viscosity of the non-data zone region and not the whole lubrication layer, thereby producing a higher viscosity non-data zone region and a lower viscosity data zone region within the lubrication layer; and removing at least a portion of the lower viscosity lubrication layer from the data zone region, thereby decreasing the thickness of the lubrication layer in the lower viscosity data zone region.

2. The method of claim 1, wherein the lower viscosity region overlies the entirety of a data portion of the disk.

3. The method of claim 1, wherein the step of increasing viscosity comprises polymerizing the lubrication to be made more viscous.

4. The method of claim 1, wherein the step of increasing viscosity comprises exposing to radiation the lubrication to be made more viscous.

5. The method of claim 1, wherein the method is performed on both sides of the magnetic media disk.

6. The method of claim 1, wherein the step of removing at least a portion of the lower viscosity region of the lubrication layer comprises using a lubrication removal head.

7. The method of claim 1, wherein the step of removing at least a portion of the lower viscosity region of the lubrication layer comprises applying solvent.

8. The method of claim 1, wherein the step of removing at least a portion of the lower viscosity region of the lubrication layer comprises using a tape pickup.

9. The method of claim 8, further comprising the step of cleaning the tape pickup during the removal process.

10. The method of claim 1, further comprising the step of burnishing at least a portion of the disk surface.

11. The method of claim 10, wherein the portion of the disk surface burnished comprises the region having lower viscosity lubrication.

12. The method of claim 1, wherein the thickness of the lower viscosity region is less than 10 angstroms.

13. The method of claim 1, wherein the magnetic media disk has substantially the same texturing over the entire surface of the disk.

14. The method of claim 1, wherein the coefficient of friction of the lower viscosity region is less than half of the coefficient of friction of the higher viscosity region.

15. A method of manufacture, comprising:

applying lubrication to a magnetic media disk, thereby forming a first lubrication layer, the first lubrication layer being of substantially equal thickness over the entire surface;

bonding at least a non-data zone portion of the first lubrication layer to the magnetic media disk;

applying a second layer of lubrication over a selected non-data zone portion of the disk less than the entire disk;

increasing the viscosity of the second lubrication layer, thereby producing a higher viscosity region of greater thickness in the non-data zone portion than the region without the second lubrication layer.

16. The method of claim 15, wherein the step of bonding at least a portion of the first lubrication layer is followed by the step of removing at least a portion of the first lubrication layer from a data zone portion of the disk.

* * * * *